Sept. 5, 1961   C. A. HAWKINS   2,998,676
PRECISION LAPPING DEVICE
Filed April 29, 1960   2 Sheets-Sheet 1

Charles A. Hawkins,
INVENTOR.

BY S. J. Rotondi,
A. T. Dupont, and
Alvin E. Moore,
ATTORNEYS.

Sept. 5, 1961   C. A. HAWKINS   2,998,676
PRECISION LAPPING DEVICE
Filed April 29, 1960   2 Sheets-Sheet 2

Charles A. Hawkins,
*INVENTOR.*

BY  S. J. Rotondi,
A. T. Dupont, and
Alvin E. Moore,
ATTORNEYS.

_2,998,676_
PRECISION LAPPING DEVICE
Charles A. Hawkins, 3505 Ridgecrest Ave. SW.,
Huntsville, Ala.
Filed Apr. 29, 1960, Ser. No. 25,801
10 Claims. (Cl. 51—45)
(Granted under Title 35, U.S. Code (1952), sec. 266)

The invention described herein may be manufactured and used by or for the Government for governmental purposes without the payment of any royalty thereon.

This invention relates to a precision lapping device. Such a device enables either balls or sockets to be finished with a high degree of accuracy. In the use of lapping machines, there is a need for a device that will accurately finish balls or sockets of a wide range of diameters.

Accordingly, an object of this invention is to provide a machine that will lap either a ball or a socket having a large diameter.

Another object of this invention is to provide a machine that will lap either a ball or a socket having a small diameter.

A further object of this invention is to provide a machine that will lap either a ball or a socket with a high degree of accuracy.

The foregoing and other objects of this invention will become more fully apparent from the following detailed description of the embodiment of the invention and from the accompanying drawings, in which.

Figure 1:
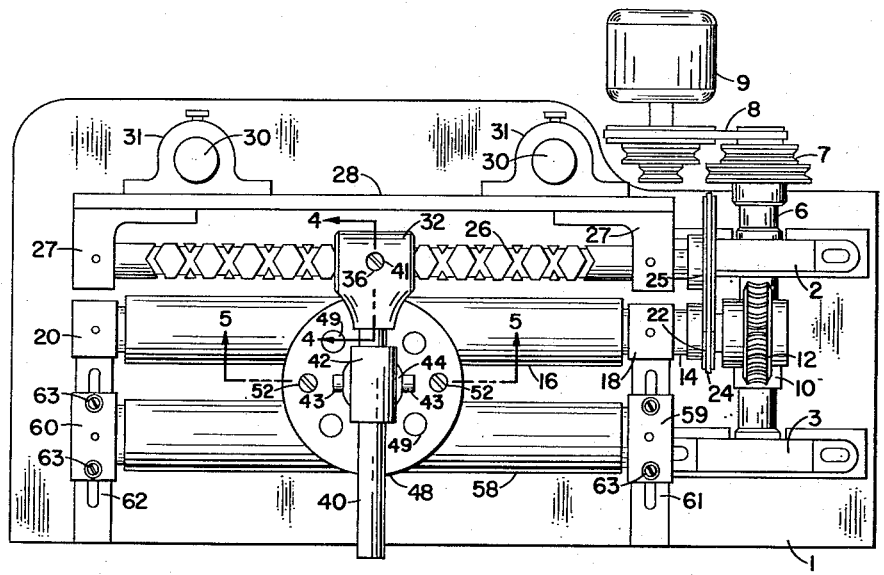
FIGURE 1 is a plan view of the invention.
Figure 2:
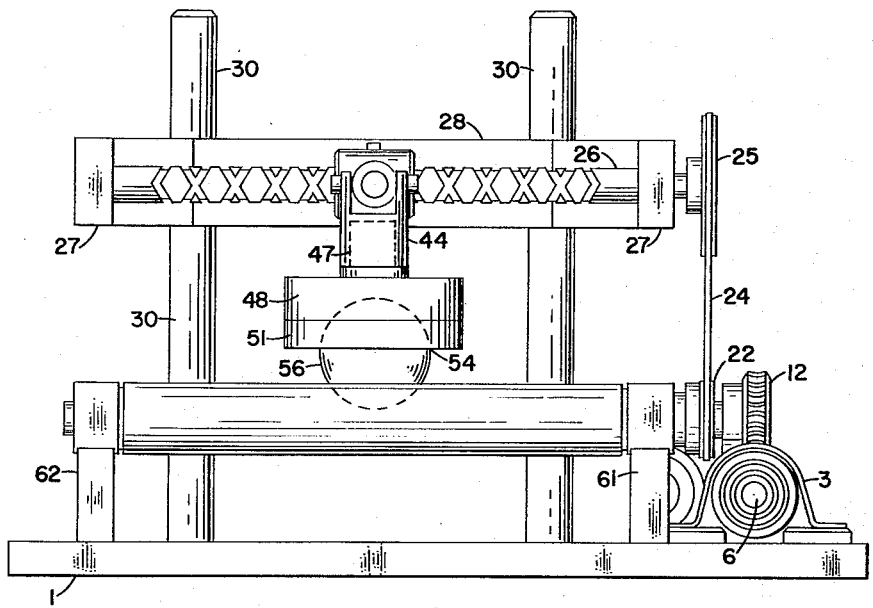
FIGURE 2 is a front elevational view of the invention.
Figure 3:
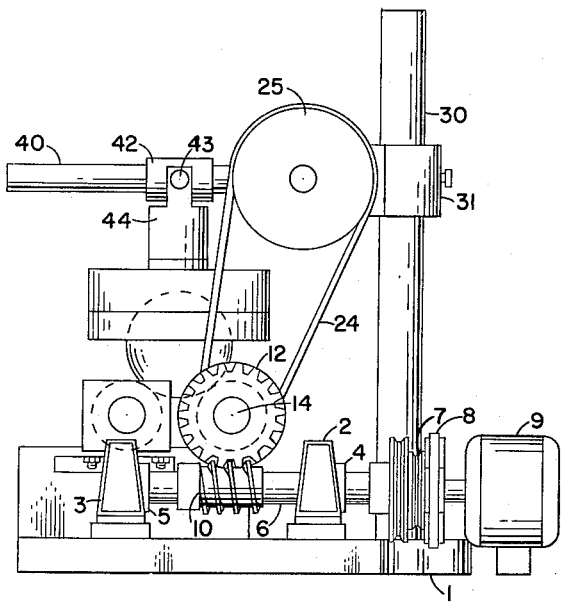
FIGURE 3 is an end elevational view of FIGURE 2.

In the drawings, wherein for the purpose of illustration there is shown a preferred embodiment of the invention, the numeral 1 designates a machine top or mounting plate.

A pair of pillow blocks 2 and 3 are attached to the machine top. These blocks are adapted to secure a pair of bearings 4 and 5, which journal rotatable shaft 6.

Shaft 6 has a cone pulley 7 attached to one of its ends for receiving a resilient drive belt 8. This belt is also attached to the cone pulley of a drive motor 9. Shaft 6 is provided with a worm 10, which is secured to the shaft between the pillow blocks, and meshes with worm gear 12. Worm gear 12 is secured to one end of a shaft 14 that is journaled in bearings 18 and 20. Shaft 14 is covered with rubber or neoprene intermediate its ends to form a roller 16. The end of shaft 14 adjacent bearing mount 18 has a pulley 22 operably connected, by belt 24, to a second pulley 25. Obviously, the pulleys and belts may be replaced by meshed gears.

Pulley 25 is attached to one end of a double-helix, traverse-threaded screw 26. This screw is rotatable in the inner race or bushing of radial and thrust bearings that are secured in bearing supports 27 by pins or other means. These bearing supports are fixed to a plate 28 that is attached, in a manner that allows adjustment of its height from top 1, to a pair of parallel, vertical columns 30, by means of mounts 31. The columns are secured to the machine top.

Figure 4:
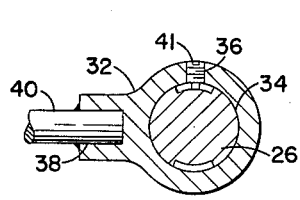
FIGURE 4 is a sectional view, partly broken away, along the line 4—4 of FIGURE 1.
Figure 5:
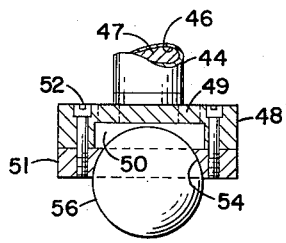
FIGURE 5 is a sectional view, partly broken away, along line 5—5 of FIGURE 1.

A substantially T-shaped arm 32 (FIGURE 4) having a first aperture 34 and a second aperture 36, normal to said first aperture, is adapted to freely receive screw 26 in aperture 34. The leg portion of arm 32 is fixed by means of bore 38, and welding or screwthreads, to shaft 40. Aperture 36 is disposed so as to retain pin 41 in engagement with the threads of screw 26.

A sleeve 42 is adapted to slidably fit on shaft 40. This sleeve has a hanger pin 43 on each side, normal to shaft 40, adapted to pivotally secure the arms of yoke 44 to sleeve 42. The end of yoke 44 opposite from hangers 43 contains an axial bore 46 adapted to receive one end of a shaft 47, which is attached at its other end to holder 48.

As shown in FIGURE 1, this holder has a plurality of bores 49 spaced around its connection with shaft 47. Holder 48, also contains a hollow space 50 which flow-connects with bores 49.

A lap ring 51 is secured to holder 48 by screws 52; it has an annular bore 54, which joins hollow space 50 and is adapted to closely receive a substantially spherical ball or element 56, which is to be finished by lapping.

Part of ball 56 rests on and between rollers 16 and 58. Roller 58 is spaced a distance from roller 16 which is less than the diameter of ball 56, and is parallel to roller 16.

Roller 58 is made of the same material as roller 16 and is journaled relative to machine top 1 by bearings 59 and 60. These bearings are adjustably secured to tracks 61 and 62, so that the space between rollers 16 and 58 can be adjusted after loosening bolts 63. Roller 58 is an idler and differs from roller 16 by not being connected to any power source.

As described above, the device is used to lap a ball or other substantially spherical element. Alternatively, the ball may be used as the lapping instrument to lap the inside concave surface of an element to a desired radius of curvature.

The operation of this invention is as follows:

A lap ring of a relatively soft metal such as copper, brass, lead or close-grained cast iron, with a lower cavity that is of slightly larger radius of curvature than the spherical element that is to be lapped, is attached to holder 48 by screws 52. The substantially spherical element of harder material than the lap ring is fitted in the concave surface of the lap ring. Plate 28 is adjusted until the substantially spherical element or ball is closely nested in the concave surface and on rollers 16 and 58, abrasive material, such as aluminum oxide, silicon carbide or diamond grits, is mixed with oil supplied, thru bores 49, to element 56 and motor 9 is energized.

Motor 9 rotates roller 16 and screw 26. Movement of roller 16 causes element 56 and idle roller 58 to rotate. At the same time screw 26 causes transverse movement of lap ring 51 and ball 56.

This operation is continued until element 56 is smoothly finished and within the desired tolerance.

If a concave spherical surface of a socket is to be formed, the lap ring is removed and the socket is attached to holder 48, and element 56 is replaced by an element of softer material than the material of the socket. Abrasive material is applied to the socket and motor 9 is energized. The remainder of the operation is carried out in the manner described above.

Although the form of the invention herein shown and described is the preferred embodiment, various changes in the shape, size and arrangement of parts may be resorted to without departing from the spirit of the invention, or the scope of the subjoined claims.

The following invention is claimed:

1. A lapping device comprising: a support; a pair of rollers on said support, one being a driven roller and the other an idler; a substantially spherical element, whereby lapping of said element or said indented means can be accomplished rotatably supported by said rollers; concavely indented means adapted to partially receive said element; means, secured to said support, for imparting transverse movement to said indented means; means for driving said driven roller and said means for imparting reciprocatory transverse movement to said indented means; whereby said element is rotated in one direction by said driven member and at the same time is reciprocated by said means for imparting transverse movement.

2. A device as set forth in claim 1, in which the outer surface of said rollers is of plastic.

3. A device as set forth in claim 1, in which said indented means comprises a lap ring; provided with a concave surface, and a hollow holder for supporting said lap ring, said holder having a plurality of apertures leading from above said holder to said hollow of said holder, whereby lapping abrasive may be introduced thru said apertures.

4. A device as set forth in claim 1, in which said substantially spherical element is of softer material than said indented means, whereby the portion of said indented means which contacts said element will be enlarged in size.

5. A device as set forth in claim 1, in which said means, secured to said support, for imparting transverse motion to said indented means comprises a screw, having double-helix, joined threads, a T-shaped arm supported by said screw, a pin secured in said arm and slidable in said threads and a pivotable yoke connecting said arm and said indented member.

6. A device as set forth in claim 1, in which said indented means is of softer material than said element, whereby said element may be reduced in size by abrasive in the operation of the device.

7. A lapping device comprising: a mounting plate; a first roller and a second roller journaled relative to said plate for supporting a spherical element to be lapped thereon; a worm gear secured to one end of said first roller; a pulley secured, to said end of said first roller, adjacent to said gear; a pair of bearing mounts secured to said plate; a shaft journaled by said mounts; a worm secured to said shaft, intermediate said mounts, in mesh with said worm gear; a cone pulley secured to one end of said shaft; a motor drivably connected to said cone pulley; a double-helix screw secured to said plate; a pulley secured to one end of said screw juxtaposed with said roller pulley; resilient means for drivably connecting said screw pulley and said roller pulley; a T-shaped member surrounding a portion of said screw; a pin movably supporting said member on said screw; a yoke having one end pivotably attached to said T-shaped member; a concavely indented member secured to the other end of said yoke and partially enclosing said spherical element.

8. A lapping device comprising: a support; a rotary motor fixed to said support; mechanism, comprising a horizontally reciprocable element, drivably connected to said motor, for transforming the rotary motion of the motor to reciprocating motion of said reciprocable element; a pair of rollers on said support, one being a driven roller and the other an idler; means on said support for varying the space between said rollers in various lapping operations; a downwardly opening cup having an interior surface and having apertures for the supply of abrasive material from above the cup to said interior surface; and means for connecting said cup to said reciprocable element.

9. A device as set forth in claim 8, in which the interior surface of said downwardly opening cup is concave.

10. A lapping device comprising: a support; a rotary motor fixed to said support; mechanism, comprising a horizontally reciprocable element, drivably connected to said motor, for transforming the rotary motion of the motor to reciprocating motion of said reciprocable element; a pair of rollers on said support, one being a driven roller and the other an idler; means on said support for varying the space between said rollers in various lapping operations; a substantially spherical element rotatably supported by said rollers; and means for maintaining an indented element to be lapped in engagement with said spherical element.

References Cited in the file of this patent

UNITED STATES PATENTS

| | | |
|---|---|---|
| 1,343,011 | Sellew | June 8, 1920 |
| 1,805,878 | McIntyre | May 19, 1931 |
| 2,075,216 | Mancuso | Mar. 30, 1937 |